United States Patent
Lietz et al.

(10) Patent No.: US 9,473,481 B2
(45) Date of Patent: Oct. 18, 2016

(54) METHOD AND SYSTEM FOR PROVIDING A VIRTUAL ASSET PERIMETER

(71) Applicant: Intuit Inc., Mountain View, CA (US)

(72) Inventors: M. Shannon Lietz, San Marcos, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 97 days.

(21) Appl. No.: 14/448,281

(22) Filed: Jul. 31, 2014

(65) Prior Publication Data

US 2016/0036795 A1  Feb. 4, 2016

(51) Int. Cl.
| | |
|---|---|
| H04L 29/06 | (2006.01) |
| G06F 21/53 | (2013.01) |
| G06F 21/56 | (2013.01) |

(52) U.S. Cl.
CPC .............. *H04L 63/08* (2013.01); *G06F 21/53* (2013.01); *G06F 21/56* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 5,712,641 A | 1/1998 | Casabona et al. |
| 5,731,991 A | 3/1998 | Kinra et al. |
| 6,085,224 A | 7/2000 | Wagner |
| 6,205,552 B1 | 3/2001 | Fudge |
| 6,343,236 B1 | 1/2002 | Gibson et al. |
| 6,549,932 B1 | 4/2003 | McNally et al. |
| 6,651,183 B1 | 11/2003 | Gensler et al. |
| 7,114,183 B1 | 9/2006 | Joiner |
| 7,296,261 B2 | 11/2007 | Witchel et al. |
| 7,373,524 B2 | 5/2008 | Motsinger et al. |
| 7,426,745 B2 | 9/2008 | McCarty |
| 7,506,371 B1 | 3/2009 | Ben-Natan |
| 7,552,424 B1 | 6/2009 | Bischof et al. |
| 7,640,458 B2 | 12/2009 | Rao et al. |
| 7,761,923 B2 | 7/2010 | Khuti et al. |
| 7,788,235 B1 | 8/2010 | Yeo |
| 7,792,256 B1 | 9/2010 | Arledge et al. |

(Continued)

FOREIGN PATENT DOCUMENTS

| | | |
|---|---|---|
| EP | 2 541 420 | 1/2013 |
| WO | WO 02/091182 | 11/2002 |

(Continued)

OTHER PUBLICATIONS

Lietz et al., "Method and System for Dynamic and Comprehensive Vulnerability Management," U.S. Appl. No. 14/052,971, filed Oct. 14, 2013.

(Continued)

*Primary Examiner* — Michael R Vaughan
(74) *Attorney, Agent, or Firm* — Hawley Troxell Ennis & Hawley LLP; Philip McKay

(57) ABSTRACT

A system and method provides a virtual perimeter by maintaining a data structure for identifying a first plurality of assets, according to one embodiment. The system and method provides services to a second of the first plurality of assets, at least partially based on identifiers for the first plurality of assets and at least partially based on a first role assigned to a first of the first plurality of assets, according to one embodiment. The system and method include admitting one of a second plurality of assets into the virtual perimeter if characteristics of the one of the second plurality of assets satisfy criteria for admission to the virtual perimeter, according to on embodiment.

30 Claims, 5 Drawing Sheets

(56) References Cited

U.S. PATENT DOCUMENTS

| | | |
|---|---|---|
| 7,831,570 B2 | 11/2010 | Sack et al. |
| 7,925,527 B1 | 4/2011 | Flam |
| 7,944,355 B2 | 5/2011 | Kumar et al. |
| 7,996,836 B1 | 8/2011 | McCorkendale et al. |
| 8,001,422 B1 | 8/2011 | Sun et al. |
| 8,095,962 B2 | 1/2012 | Condon |
| 8,171,485 B2 | 5/2012 | Muller |
| 8,171,554 B2 | 5/2012 | Elovici et al. |
| 8,181,036 B1 | 5/2012 | Nachenberg |
| 8,281,399 B1 | 10/2012 | Chen et al. |
| 8,312,516 B1 | 11/2012 | Malatesta |
| 8,438,643 B2 | 5/2013 | Wiemer et al. |
| 8,510,821 B1 | 8/2013 | Brandwine et al. |
| 8,555,388 B1 | 10/2013 | Wang et al. |
| 8,561,126 B2 | 10/2013 | Ananthanarayanan et al. |
| 8,561,127 B1 | 10/2013 | Agrawal et al. |
| 8,572,733 B1 | 10/2013 | Rockwood |
| 8,615,785 B2 | 12/2013 | Elrod et al. |
| 8,621,618 B1 | 12/2013 | Ramsey et al. |
| 8,683,585 B1 | 3/2014 | Chen et al. |
| 8,688,820 B1 | 4/2014 | Bhogi et al. |
| 8,726,383 B2 | 5/2014 | Blackwell |
| 8,776,050 B2 | 7/2014 | Plouffe et al. |
| 8,813,225 B1 | 8/2014 | Fuller et al. |
| 8,990,935 B1 | 3/2015 | Cutts |
| 9,047,582 B2 | 6/2015 | Hutchinson et al. |
| 9,049,105 B1 | 6/2015 | Feinstein et al. |
| 9,112,841 B1 | 8/2015 | Brandwine et al. |
| 9,270,690 B2 | 2/2016 | Kraitsman et al. |
| 2002/0066034 A1 | 5/2002 | Schlossberg et al. |
| 2002/0099992 A1 | 7/2002 | Distler et al. |
| 2002/0116404 A1 | 8/2002 | Cha et al. |
| 2002/0138416 A1 | 9/2002 | Lovejoy et al. |
| 2002/0147803 A1 | 10/2002 | Dodd et al. |
| 2003/0046128 A1 | 3/2003 | Heinrich |
| 2003/0051154 A1 | 3/2003 | Barton et al. |
| 2003/0084327 A1 | 5/2003 | Lingafelt et al. |
| 2003/0088791 A1 | 5/2003 | Porras et al. |
| 2003/0110392 A1 | 6/2003 | Aucsmith et al. |
| 2003/0188191 A1 | 10/2003 | Aaron et al. |
| 2003/0195959 A1 | 10/2003 | Labadie et al. |
| 2003/0233438 A1 | 12/2003 | Hutchinson et al. |
| 2004/0006704 A1 | 1/2004 | Dahlstrom et al. |
| 2004/0181775 A1 | 9/2004 | Anonsen et al. |
| 2004/0237093 A1 | 11/2004 | Sluiman et al. |
| 2004/0249973 A1* | 12/2004 | Alkhatib ............ H04L 12/4641 709/245 |
| 2004/0249974 A1* | 12/2004 | Alkhatib ........... H04L 29/12349 709/245 |
| 2005/0018618 A1 | 1/2005 | Mualem et al. |
| 2005/0066309 A1 | 3/2005 | Creamer et al. |
| 2005/0091304 A1 | 4/2005 | Trayler |
| 2005/0114836 A1 | 5/2005 | Fu |
| 2005/0155013 A1 | 7/2005 | Carrigan |
| 2005/0172162 A1 | 8/2005 | Takahashi et al. |
| 2005/0182969 A1 | 8/2005 | Ginter et al. |
| 2005/0188222 A1 | 8/2005 | Motsinger et al. |
| 2005/0193231 A1 | 9/2005 | Scheuren |
| 2005/0193269 A1 | 9/2005 | Haswell et al. |
| 2005/0204151 A1 | 9/2005 | Fang et al. |
| 2005/0278790 A1 | 12/2005 | Birk et al. |
| 2006/0031407 A1* | 2/2006 | Dispensa ......... H04L 29/12009 709/219 |
| 2006/0037077 A1 | 2/2006 | Gadde et al. |
| 2006/0090206 A1 | 4/2006 | Ladner et al. |
| 2006/0101520 A1 | 5/2006 | Schumaker et al. |
| 2006/0184838 A1 | 8/2006 | Singonahalli et al. |
| 2006/0203739 A1 | 9/2006 | Padmanabhan et al. |
| 2006/0293940 A1 | 12/2006 | Tsyganskiy et al. |
| 2007/0027999 A1 | 2/2007 | Allen et al. |
| 2007/0079168 A1 | 4/2007 | Sivakumar et al. |
| 2007/0094711 A1 | 4/2007 | Corley et al. |
| 2007/0180509 A1 | 8/2007 | Swartz et al. |
| 2007/0185875 A1 | 8/2007 | Chang et al. |
| 2007/0250424 A1 | 10/2007 | Kothari |
| 2008/0016570 A1 | 1/2008 | Capalik |
| 2008/0025288 A1 | 1/2008 | Benner et al. |
| 2008/0044018 A1 | 2/2008 | Scrimsher et al. |
| 2008/0141332 A1 | 6/2008 | Treinen |
| 2008/0148398 A1 | 6/2008 | Mezack et al. |
| 2008/0177691 A1 | 7/2008 | Alperovitch et al. |
| 2008/0262990 A1 | 10/2008 | Kapoor et al. |
| 2008/0263670 A1 | 10/2008 | Stavrica |
| 2008/0295076 A1 | 11/2008 | McKain et al. |
| 2009/0007264 A1 | 1/2009 | Chatterjee et al. |
| 2009/0089682 A1 | 4/2009 | Baier et al. |
| 2009/0106838 A1 | 4/2009 | Clark et al. |
| 2009/0199273 A1 | 8/2009 | Yalamanchi |
| 2009/0228973 A1* | 9/2009 | Kumar ................ H04L 63/0272 726/15 |
| 2009/0254970 A1 | 10/2009 | Agarwal et al. |
| 2009/0254990 A1 | 10/2009 | McGee |
| 2009/0288078 A1 | 11/2009 | Makonahalli et al. |
| 2009/0300045 A1 | 12/2009 | Chaudhry et al. |
| 2009/0300423 A1 | 12/2009 | Ferris |
| 2009/0319527 A1 | 12/2009 | King et al. |
| 2010/0020700 A1 | 1/2010 | Kailash et al. |
| 2010/0030544 A1 | 2/2010 | Gopalan et al. |
| 2010/0070964 A1 | 3/2010 | Blumfield et al. |
| 2010/0077203 A1 | 3/2010 | Ogawa et al. |
| 2010/0122317 A1 | 5/2010 | Yadav |
| 2010/0192220 A1 | 7/2010 | Heizmann et al. |
| 2010/0212010 A1 | 8/2010 | Stringer et al. |
| 2010/0217850 A1 | 8/2010 | Ferris |
| 2010/0251363 A1 | 9/2010 | Todorovic |
| 2010/0257580 A1 | 10/2010 | Zhao |
| 2010/0257599 A1 | 10/2010 | Gleichauf |
| 2010/0269121 A1 | 10/2010 | Montesissa et al. |
| 2010/0306354 A1 | 12/2010 | DeHaan et al. |
| 2010/0318481 A1 | 12/2010 | Feynman |
| 2011/0029957 A1 | 2/2011 | Shufer et al. |
| 2011/0034182 A1 | 2/2011 | Issa et al. |
| 2011/0047621 A1 | 2/2011 | Brando et al. |
| 2011/0055921 A1 | 3/2011 | Narayanaswamy et al. |
| 2011/0101109 A1 | 5/2011 | Bona et al. |
| 2011/0138382 A1 | 6/2011 | Hauser et al. |
| 2011/0138469 A1 | 6/2011 | Ye et al. |
| 2011/0145657 A1 | 6/2011 | Bishop et al. |
| 2011/0154324 A1 | 6/2011 | Pagan et al. |
| 2011/0208677 A1 | 8/2011 | Zhou et al. |
| 2011/0208797 A1* | 8/2011 | Kim .................... G06F 21/554 709/202 |
| 2011/0238855 A1 | 9/2011 | Korsunsky et al. |
| 2012/0005750 A1 | 1/2012 | Satish |
| 2012/0039336 A1 | 2/2012 | Richmond et al. |
| 2012/0072985 A1 | 3/2012 | Davne et al. |
| 2012/0110672 A1 | 5/2012 | Judge et al. |
| 2012/0117654 A1 | 5/2012 | Yalakanti |
| 2012/0137367 A1 | 5/2012 | Dupont et al. |
| 2012/0151488 A1 | 6/2012 | Arcese et al. |
| 2012/0185390 A1 | 7/2012 | Palnitkar et al. |
| 2012/0185913 A1 | 7/2012 | Martinez et al. |
| 2012/0209947 A1 | 8/2012 | Glaser et al. |
| 2012/0210437 A1 | 8/2012 | Karande et al. |
| 2012/0233668 A1 | 9/2012 | Leafe et al. |
| 2012/0303776 A1 | 11/2012 | Ferris |
| 2012/0304300 A1 | 11/2012 | LaBumbard |
| 2012/0311016 A1 | 12/2012 | DeAnna et al. |
| 2012/0311157 A1 | 12/2012 | Erickson et al. |
| 2012/0311387 A1 | 12/2012 | Santhosh et al. |
| 2012/0324572 A1 | 12/2012 | Gordon et al. |
| 2012/0324576 A1 | 12/2012 | Clark et al. |
| 2013/0019242 A1 | 1/2013 | Chen et al. |
| 2013/0046667 A1 | 2/2013 | Hill et al. |
| 2013/0054792 A1 | 2/2013 | Sharaf |
| 2013/0055398 A1 | 2/2013 | Li et al. |
| 2013/0067067 A1 | 3/2013 | Miri et al. |
| 2013/0091376 A1 | 4/2013 | Raspudic et al. |
| 2013/0097316 A1 | 4/2013 | Bender et al. |
| 2013/0104237 A1 | 4/2013 | Riley et al. |
| 2013/0117809 A1 | 5/2013 | McDougal et al. |
| 2013/0117852 A1 | 5/2013 | Stute |
| 2013/0125121 A1 | 5/2013 | White |
| 2013/0132854 A1* | 5/2013 | Raleigh ................ G06F 3/0482 |

(56) References Cited

U.S. PATENT DOCUMENTS

| | | | 715/738 |
|---|---|---|---|
| 2013/0133072 A1 | 5/2013 | Kraitsman et al. | |
| 2013/0160072 A1 | 6/2013 | Reus et al. | |
| 2013/0174259 A1 | 7/2013 | Pearcy et al. | |
| 2013/0185795 A1 | 7/2013 | Winn et al. | |
| 2013/0227695 A1 | 8/2013 | Shankar | |
| 2013/0238786 A1 | 9/2013 | Khesin | |
| 2013/0247135 A1 | 9/2013 | Kundu et al. | |
| 2013/0276108 A1 | 10/2013 | Blackwell | |
| 2013/0276152 A1 | 10/2013 | Hirsch et al. | |
| 2013/0291068 A1 | 10/2013 | Huang et al. | |
| 2013/0291087 A1 | 10/2013 | Kailash et al. | |
| 2013/0305357 A1 | 11/2013 | Ayyagari et al. | |
| 2013/0305369 A1 | 11/2013 | Karta et al. | |
| 2013/0305371 A1 | 11/2013 | Figlin et al. | |
| 2013/0339514 A1 | 12/2013 | Crank et al. | |
| 2013/0346596 A1 | 12/2013 | Balakrishnan et al. | |
| 2013/0347131 A1 | 12/2013 | Mooring et al. | |
| 2014/0013452 A1 | 1/2014 | Aissi et al. | |
| 2014/0026122 A1 | 1/2014 | Markande et al. | |
| 2014/0026179 A1 | 1/2014 | Devarajan et al. | |
| 2014/0068784 A1 | 3/2014 | Merkow et al. | |
| 2014/0074799 A1 | 3/2014 | Karampuri et al. | |
| 2014/0082621 A1 | 3/2014 | Fitzgerald et al. | |
| 2014/0089204 A1 | 3/2014 | Spies et al. | |
| 2014/0096134 A1 | 4/2014 | Barak et al. | |
| 2014/0165130 A1 | 6/2014 | Zaitsev | |
| 2014/0173738 A1 | 6/2014 | Condry et al. | |
| 2014/0189680 A1 | 7/2014 | Kripalani | |
| 2014/0214460 A1 | 7/2014 | Rahnama | |
| 2014/0258446 A1 | 9/2014 | Bursell | |
| 2014/0258715 A1 | 9/2014 | Rodniansky | |
| 2014/0259169 A1 | 9/2014 | Harrison | |
| 2014/0282840 A1 | 9/2014 | Guinan | |
| 2014/0289854 A1 | 9/2014 | Mahvi | |
| 2014/0317737 A1 | 10/2014 | Shin et al. | |
| 2014/0344933 A1 | 11/2014 | Huh et al. | |
| 2015/0032587 A1 | 1/2015 | Broom et al. | |
| 2015/0033340 A1 | 1/2015 | Giokas | |
| 2015/0052108 A1 | 2/2015 | Volk et al. | |
| 2015/0052402 A1 | 2/2015 | Gurumurthy et al. | |
| 2015/0095691 A1 | 4/2015 | Edwards | |
| 2015/0106939 A1 | 4/2015 | Lietz et al. | |
| 2015/0128246 A1 | 5/2015 | Feghali et al. | |
| 2015/0128274 A1 | 5/2015 | Giokas | |
| 2015/0150123 A1 | 5/2015 | Be'ery | |
| 2015/0229661 A1 | 8/2015 | Balabine et al. | |
| 2015/0371044 A1 | 12/2015 | Horne et al. | |

FOREIGN PATENT DOCUMENTS

| WO | WO 2012/135192 | 10/2012 |
|---|---|---|
| WO | WO 2013/067404 | 5/2013 |
| WO | WO 2015/102776 | 7/2015 |

OTHER PUBLICATIONS

Lietz et al., "Method and System for Creating and Dynamically Deploying Resource Specific Discovery Agents for Determining the State of a Cloud Computing Environment," U.S. Appl. No. 14/079,425, filed on Nov. 13, 2013.

Lietz et al., "Method and System for Creating Enriched Log Data," U.S. Appl. No. 14/139,449, filed Dec. 23, 2013.

Cabrera et al., "Method and System for Intrusion and Extrusion Detection," U.S. Appl. No. 14/143,999, filed Dec. 30, 2013.

Cabrera et al., "Method and System for Extrusion and Intrusion Detection in a Cloud Computing Environment Using Network Communications Devices," U.S. Appl. No. 14/166,116, filed Jan. 28, 2014.

Cabrera et al., "Method and System for Extrusion and Intrusion Detection in a Cloud Computing Environment," U.S. Appl. No. 14/171,388, filed Feb. 3, 2014.

Lietz et al., "Method and System for Virtual Asset Assisted Extrusion and Intrusion Detection in a Cloud Computing Environment," U.S. Appl. No. 14/171,438, filed Feb. 3, 2014.

Bishop et al., "Method and System for Testing Cloud Based Applications in a Production Environment Using Fabricated User Data," U.S. Appl. No. 14/222,279, filed Mar. 21, 2014.

Weaver et al., "Method and System for Comparing Different Versions of a Cloud Based Application in a Production Environment Using Segregated Backend Systems," U.S. Appl. No. 14/231,141, filed Mar. 31, 2014.

Brinkley et al., "Method and System for Testing Cloud Based Applications and Services in a Production Environment Using Segregated Backend Systems," U.S. Appl. No. 14/231,253, filed Mar. 31, 2014.

Lietz et al., "Method and System for Providing Security Aware Applications," U.S. Appl. No. 14/247,131, filed Apr. 7, 2014.

Cabrera et al., Method and System for Providing Self-Monitoring, Self-Reporting, and Self-Repairing Virtual Assets in a Cloud Computing Environment, U.S. Appl. No. 14/256,289, filed Apr. 18, 2014.

Bishop et al., "Method and System for Ensuring an Application Conforms with Security and Regulatory Controls Prior to Deployment," U.S. Appl. No. 14/261,621, filed Apr. 25, 2014.

Lietz et al., "Method and System for Detecting Irregularities and Vulnerabilities in Dedicated Hosting Environments," U.S. Appl. No. 14/266,018, filed Apr. 30, 2014.

Lietz et al., "Method and System for Providing Reference Architecture Pattern-Based Permissions Management," U.S. Appl. No. 14/266,107, filed Apr. 30, 2014.

Cabrera et al., "Method and Apparatus for Automating the Building of Threat Models for the Public Cloud," U.S. Appl. No. 14/288,260, filed May 27, 2014.

Bonney et al., "Method and System for Implementing Data Security Policies Using Database Classification," U.S. Appl. No. 14/289,817, filed May 29, 2014.

Lietz et al., "Method and System for Secure Delivery of Information to Computing Environments," U.S. Appl. No. 14/319,286, filed Jun. 30, 2014.

Cabrera et al., "Method and System for Efficient Management of Security Threats in a Distributed Computing Environment," U.S. Appl. No. 14/319,352, filed Jun. 30, 2014.

Cabrera et al., "Method and System for Providing Automated Self-Healing Virtual Assets," U.S. Appl. No. 14/448,326, filed Jul. 31, 2014.

\* cited by examiner

METHOD AND SYSTEM FOR PROVIDING A VIRTUAL ASSET PERIMETER

BACKGROUND

Traditional techniques for securing applications and/or computing systems from attack by potential security threats are becoming less effective as computing environments change. For example, traditional computing environment perimeters, e.g., firewalls, were placed at choke points within private networks to protect the applications and computing systems within the private network. A traditional computing environment perimeter may have been useful in protecting applications from external potential security threats when the applications were hosted within the private network or intranet. However, because current computing practices include hosting applications in cloud computing environments (e.g., that are external to the private network) for access by computing systems within the private network, the traditional computing environment perimeter of the private network has become a less effective tool for protecting hosted applications. Traditional computing environment perimeters are also less effective at protecting against back door attacks, and encouraged users to enter and leave through network back doors.

What is needed is a method and system for providing a virtual asset perimeter that provides protection through an elastic perimeter and that includes and incorporates trusted or vetted assets.

SUMMARY

In accordance with one embodiment, a system and method for providing a virtual perimeter includes maintaining, with a first instance of a virtual perimeter agent, a data structure for identifying the first plurality of assets, according to one embodiment. The first instance of the virtual perimeter agent resides on a first of the first plurality of assets, and the data structure includes identifiers for the first plurality of assets, according to one embodiment. The first plurality of assets include computing systems configured to communicate over one or more networks, and the first plurality of assets is included within the virtual perimeter and a second plurality of assets is excluded from the virtual perimeter, according to one embodiment. The system and method include providing services, from a first of the first plurality of assets, to a second of the first plurality of assets, at least partially based on the identifiers for the first plurality of assets and at least partially based on a first role assigned to the first of the first plurality of assets, according to one embodiment. The first role is enforced on the first of the first plurality of assets by the first instance of the virtual perimeter agent, according to one embodiment. The system and method include admitting one of the second plurality of assets into the virtual perimeter if characteristics of the one of the second plurality of assets satisfy criteria for admission to the virtual perimeter, according to on embodiment. Admitting the one of the second plurality of assets can include installing a second instance of the virtual perimeter agent on the one of the second plurality of assets; adding an identifier of the one of the second plurality of assets to the data structure; and assigning a second role to the one of the second plurality of assets to determine second access privileges of the one of the second plurality of assets within the virtual perimeter, according to one embodiment.

In accordance with one embodiment, a system and method for maintaining a secure virtual perimeter of communicatively coupled assets includes receiving, with a first asset, a request asset for access to the virtual perimeter, from a second asset, according to one embodiment. The first asset is one of a first plurality of assets and the second asset is one of a second plurality of assets, and the first plurality of assets are included in the virtual perimeter and the second plurality of assets are excluded from the virtual perimeter, according to one embodiment. Each of the first plurality of assets and each of the second plurality of assets include one or more of a server, a computing system, a virtual machine, and a mobile device, according to one embodiment. The system and method include transmitting, with the first asset, a request for configuration information of the second asset, from the second asset. The system and method include receiving the configuration information of the second asset from the second asset. The system and method include determining whether the configuration information of the second asset satisfies conditions for admission to the virtual perimeter. The system and method include assigning a role to the second asset if the configuration information of the second asset satisfies the conditions for admission to the virtual perimeter. The system and method include providing virtual perimeter admission information to the second asset to enable the second asset to share services and resources with the first plurality of assets within the virtual perimeter.

Figure 1:
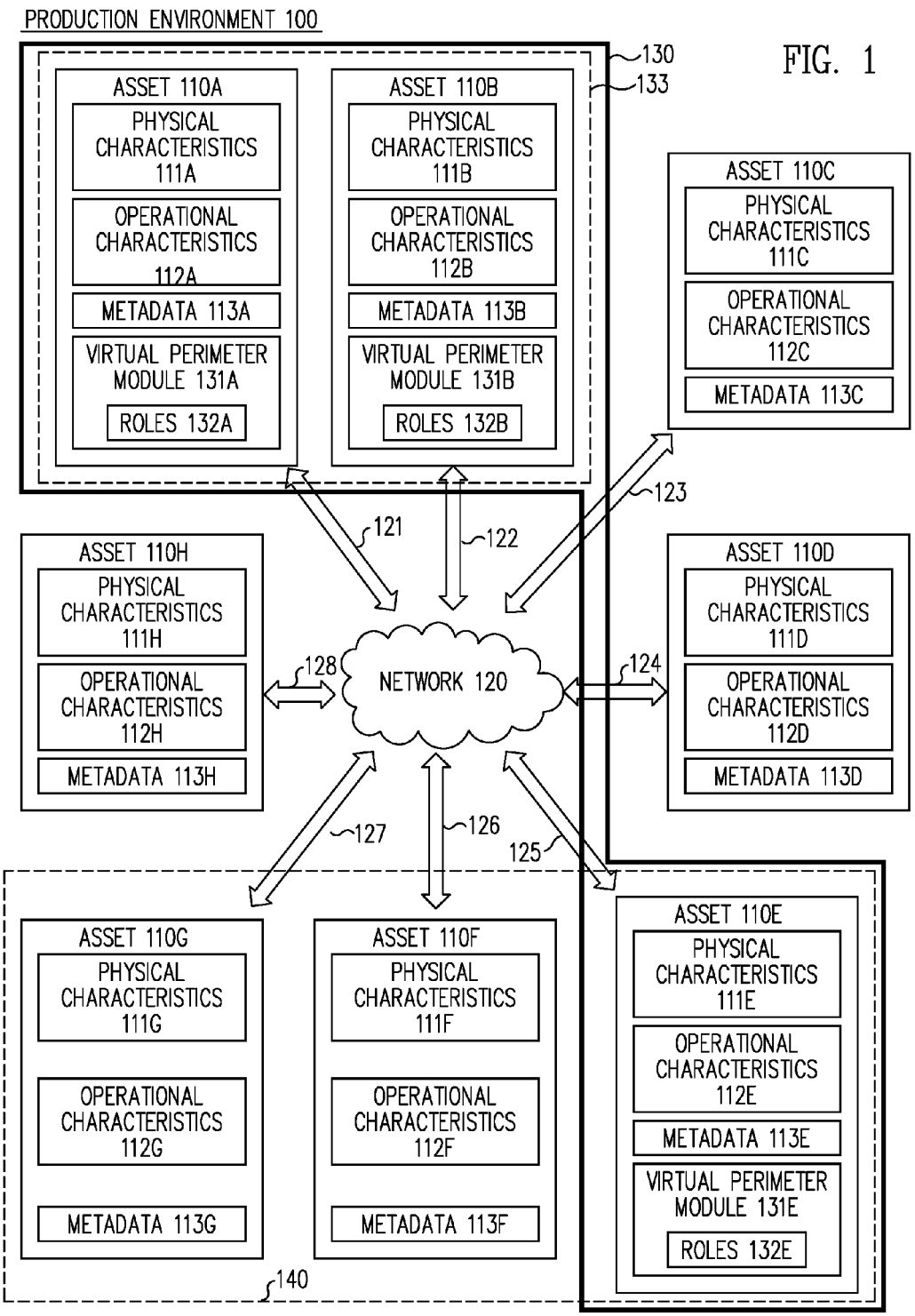
FIG. 1 is a block diagram of a hardware architecture for providing a virtual asset perimeter, in accordance with one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein include systems and processes suitable for providing a virtual asset perimeter, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate, application data must be transferred between a first computing environment that is an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system or any other fundamental element, or set of elements, used to override the default settings on a node within an infrastructure or architecture.

Other examples of virtual asset creation templates include, but are not limited to, any virtual appliance used to instantiate virtual assets. One specific illustrative example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "tenant" includes, but is not limited to, any user that enters a relationship, agreement, and/or contract, with an asset service provider or other service provider to receive an allocation of one or more assets or asset resources within an asset computing environment. In some embodiments, the terms "tenant" and "tenant computing environment" are interchangeably used even though, in some cases, a tenant represents a party, parties, or entities while the tenant computing environment represents one or more computing resources that are used by or that are at least partially under the control of the tenant.

Hardware Architecture

FIG. 1 illustrates a block diagram of a production environment 100 for providing a virtual asset perimeter, according to one embodiment. Traditional computing environment perimeters for protecting assets include firewalls, which are set at choke points within a network of computing systems for the protection of the computing systems and/or other assets. Traditional computing environment perimeters, such as firewalls, were at least partially designed to block external computing systems from accessing applications that are within a private network. However, the use of cloud computing environments for hosting applications remotely from, or externally to, private networks undermines the efficacy of firewalls and other traditional computing environment perimeters. According to one embodiment the production environment 100 provides a virtual asset perimeter that provides an automatically expandable and collapsible security perimeter of trusted and/or vetted assets, such as servers, gateways, computing systems, mobile devices, virtual private clouds, virtual machines, and other virtual assets. In one embodiment, the virtual asset perimeter can be configured to secure the assets of the perimeter from potential security threats by denying access by external assets to the services and resources of virtual asset perimeter. In one embodiment, the virtual asset perimeter leverages the concept of the "Internet of things" by utilizing the networkability of assets to establish and maintain which assets are included in the virtual asset perimeter, and to provide services to the assets included in the virtual asset perimeter.

The production environment 100 utilizes the resources of multiple virtual and/or physical assets to realize a virtual asset perimeter, according to one embodiment. The production environment 100 includes assets 110, communicatively coupled together by a network 120, according to one embodiment. At least some of the assets 110 are operatively coupled and/or organized by a virtual asset perimeter 130, to provide a secure network of shared services and/or resources to the assets 110 that are within the virtual asset perimeter 130, according to one embodiment.

The assets 110 include assets 110A, 110B, 110C, 110D, 110E, 110F, 110G, and 110H, according to one embodiment. The assets 110 can include more or less assets than the eight assets illustrated in the production environment 100, according to various embodiments. In one embodiment, the assets 110 include all assets that are, that can be, and/or that will be communicatively coupled to the Internet. Each of the assets 110 includes physical characteristics 111 (inclusive of physical characteristics 111A-111H), operational characteristics 112 (inclusive of operational characteristics 112A-112H), and metadata 113 (inclusive of metadata 113A-113H), according to one embodiment. The physical characteristics 111 include, but are not limited to, memory capacity, number of processors, speed of processors, peripheral accessories (e.g., keyboard, touch screens, network cards), and platform type (e.g., server, laptop, desktop, mobile device, virtual machine). The operational characteristics 112 include, but are not limited to, available services, software capabilities, communications protocols, security features, access/permissions rights to the asset, directory services, operating systems, and user accounts for accessing the asset or for accessing other assets. The metadata 113 can include one or more of the physical characteristics 111 and/or one or more of the operational characteristics 112, according to one embodiment. Additionally, the metadata 113 includes information associated with identifying the assets 110, for example, device identifiers ("IDs"), media access control ("MAC") addresses, burned-in addresses ("BIA"), internet protocol ("IP") addresses, subnet addresses, uniform resource locators ("URLs"), domain names, and other hardware, physical, or network addresses, according to various embodiments.

Each of the assets 110 can have physical characteristics 111 and/or operational characteristics 112 that are different from others of the assets 110, according to one embodiment. For example, the asset 110A may be a server in a data center that hosts security software for identifying and resolving potential security threats within a network. As another example, the asset 110B may be an allocation of hardware, software, and firmware resources, e.g., a virtual asset or virtual machine, for use by a tenant or customer to store information or host one or more services for other users. As yet another example, the asset 110C may be a mobile device such as a smart phone from which a user accesses one or more user accounts to receive services from other assets 110. According to various embodiments, each of the assets 110 is configured as one or more of a server, a gateway, a virtual private cloud, a subnet, a virtual asset, a laptop, a desktop, a mobile device, and other computing environment. According to various embodiments, each of the assets 110 of the production environment 100 can be generically referred to as a "first asset", a "second asset", a "third asset", and so forth.

The assets 110 are communicatively coupled together through the network 120, according to one embodiment. The network 120 can include one or more communication channels 121, 122, 123, 124, 125, 126, 127, and 128 to enable the assets to communicate information to one another, according to one embodiment. The network 120 can include, but is not limited to, a LAN, a PAN, a WAN, an intranet, a virtual private cloud, and the Internet, according to various embodiments.

The virtual asset perimeter 130 includes the assets 110A, 110B, and 110E, and represents a mechanism for determining how to make relationships and for maintaining and/or changing relationships that have been created between the assets 110, according to one embodiment. The virtual asset perimeter 130 includes the ability to evolve by, for example, automatically admitting assets to the virtual asset perimeter 130 and by automatically removing assets from the virtual asset perimeter 130, in accordance with one or more rules or policies. In one embodiment, the admission and expulsion of assets to/from the virtual asset perimeter 130 is performed automatically and is at least partially based on physical characteristics, operational characteristics, metadata, and/or communications associated with a particular asset. The virtual asset perimeter 130 overcomes deficiencies of traditional parameters, e.g., firewalls, by combining security controls together with a construct to create a virtual network.

According to one embodiment, each of the assets 110 that are admitted into the virtual asset perimeter 130 receive a virtual perimeter module 131 (inclusive of virtual perimeter modules 131A, 131B, 131E) and roles 132 (inclusive of roles 132A, 132B, 132E) to define, expand, maintain, and collapse the virtual asset perimeter 130. The virtual perimeter module 131 tracks which of the assets 110 have been admitted to the virtual asset perimeter 130 by maintaining a list or data structure of identifiers, e.g., IP addresses, or the assets 110 that have been admitted to the virtual asset perimeter, in one embodiment. The virtual perimeter module 131 enables the assets 110 to admit additional assets, e.g., trusted assets, to the virtual asset perimeter 130, in one embodiment. The virtual perimeter module 131 provides security to assets 110A, 110B, 110E, by maintaining and enforcing policies for security, communications, and admission to the virtual perimeter 130, in one embodiment. The virtual perimeter module 131 also enables the sharing of services and/or resources between the assets 110, e.g., the assets 110A, 110B, 110E, of the virtual asset perimeter 130, in one embodiment.

The virtual perimeter module 131 is installed in an asset if the asset satisfies one or more predetermined conditions, according to one embodiment. An asset that requests admission to the virtual asset perimeter 130 is an admission requesting asset, and an asset that can grant admission to the virtual perimeter is an admission granting asset, in one embodiment. An admission granting asset can receive a request for admission, along with configuration information or communications history, from an admission requesting asset, and can determine whether the admissions requesting asset is a hacker or is compromised by one or more potential security threats, e.g., viruses. In one embodiment, the predetermined condition includes having a clean bill-of-health. In other words, an admission requesting asset can be required to provide communications traffic history to enable the admission granting asset to search for digital signatures that are associated with potential security threats. The admission granting asset can be configured to determine the geographic origins of the communications traffic history and the predetermined conditions can be based on the geographic origins of the communications traffic. For example, if the communications traffic history includes multiple communications having geographical origins in particular portions of, for example, the Middle-East, central Europe, or South-east Asia, the admissions granting asset can automatically deny the admissions request to the virtual asset perimeter 130, in one embodiment. To provide further security, the policies and rules for admission may be encrypted so that the reasons for the denial are not available for extraction from the admissions granting asset and are not provided to the admissions requesting asset. By keeping at least part of the admissions rules and policies a secret, the virtual perimeter module 131 can prevent or undermine attempts to falsify communications traffic data or history, according to one embodiment. Other predetermined conditions can be based on configurations of the admission requesting asset, such as whether the asset is protected by anti-virus or anti-malware software, whether the asset provides services to geographically suspicious locations, whether the asset employs encrypted communications, whether the asset is already admitted to other virtual asset perimeters, or whether the asset is configured for providing services that are desired by the virtual asset perimeter 130, e.g., computing security services, according to various embodiments.

The roles 132 received by each of the assets 110 that are admitted to the virtual asset perimeter 130 determine the access privileges of the recipient, according to one embodiment. The roles 132 can be assigned for an indefinite duration, e.g., permanent, or the roles 132 can be assigned temporarily, e.g., for 3 months or for the duration of a project. The roles 132 include, but are not limited to, architect, security, developer, operator, user, contributor, content generator, and editor. Each of the roles can include different levels of privileges within the virtual asset perimeter 130. For example, an asset with a security role can be granted access to scan each of the other assets 110 for potential security threats and/or for compliance to the rules or policies of the virtual asset perimeter 130. Because any of the assets 110 can belong to multiple virtual asset perimeters, the roles 132 can include a first set of roles for a first virtual asset perimeter and a second different set of roles for a second different virtual asset perimeter, according to one embodiment. For example, the roles 132A of the asset 110A can be limited to content generator privileges for the virtual asset perimeter 130 and can include security or architect privileges for another virtual asset perimeter to which the asset 110A is admitted. The virtual perimeter module 131 is configured to enable and/or prevent asset operations based at least in part on the roles 132 that have been assigned to the asset. For example, the virtual perimeter module 131 can be configured to enable an asset with architect privileges or security privileges to admit additional assets into the virtual asset perimeter. In one embodiment, roles 132 can be limited to a single role, e.g., content generator, or can include multiple roles, e.g., architect, security, user, and editor.

In one embodiment, the assets 110 of the virtual asset perimeter 130 are organized into a cluster 133. The cluster 133 includes the asset 110A and the asset 110B, in one embodiment. The cluster 133 represents a grouping of the assets 110A and 110B based on function or physical characteristics of the assets 110A and 110B. The assets 110A and 110B can share functional characteristics such as services provided, resources provided, roles, and/or other physical or operational characteristics, according to various embodiments. For example, the assets 110A and 110B can both be servers, mobile devices, security service providers, virtual machines, or the like, according to various embodiments.

In one embodiment, the production environment 100 includes a second virtual asset perimeter 140. The second virtual asset perimeter 140 includes the assets 110E, the asset 110F, and the asset 110G, in one embodiment. The security features, communications protocols, number of assets, and admission standards of the second virtual asset perimeter 140 are different than those of the virtual asset perimeter 130, according to one embodiment. Each of the assets 110 can be incorporated or admitted to one or more virtual asset perimeters, e.g., virtual asset perimeters 130, 140, to selectively share services and/or resources, according to one embodiment.

Figure 2:
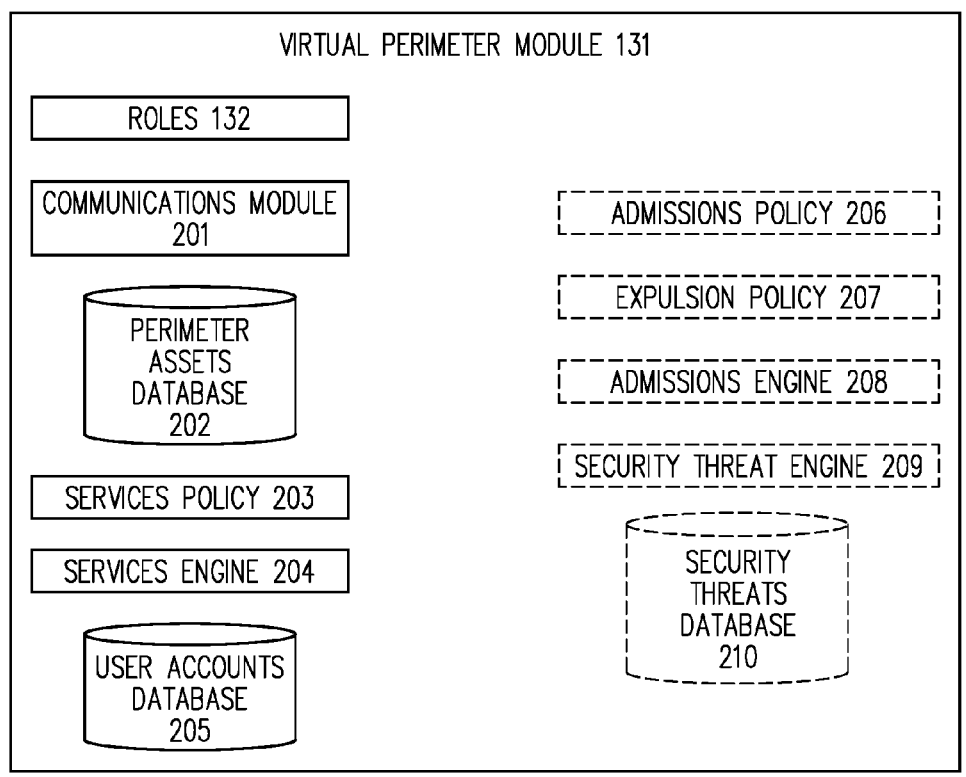
FIG. 2 is a block diagram of a virtual perimeter module used in establishing and maintaining the virtual asset perimeter, in accordance with one embodiment.

FIG. 2 is a block diagram 200 of the virtual perimeter module 131, according to one embodiment. In addition to the roles 132, the virtual perimeter module 131 includes additional functional modules, databases, and engines, according to one embodiment. In one embodiment, the function modules, databases, and engines included or enabled in an instance of a virtual perimeter module 131 is at least partially based on the roles 132 assigned to the asset 110. The virtual perimeter module 131 is described herein as a module, however, in some embodiments the virtual perimeter module 131 is implemented as a virtual perimeter agent or a virtual perimeter engine that is installed onto assets within the virtual asset perimeter 130 to enable the assets 110 to establish and maintain a virtual asset perimeter 130. The virtual perimeter module 131 includes a communications module 201, a perimeter assets database 202, a services policy 203, a services engine 204, and a user accounts database 205, according to one embodiment. Optionally, and at least partially based on the roles 132 of the asset 110, the virtual perimeter module 131 includes an admissions policy 206, an expulsion policy 207, an admissions engine 208, a security threat engine 209, and a security threats database 210, according to one embodiment.

The communications module 201 enables one asset 110 of the virtual asset perimeter 130 to communicate with another asset 110 of the virtual asset perimeter, according to one embodiment. The communications module 201 can be configured to use one or more standard or proprietary communications techniques to transfer information between the assets 110. The communications module 201 can block traffic or requests from unauthorized assets, e.g., assets 110 that are not within the virtual asset perimeter 130. The communications module 201 is configured to use the perimeter assets database 202 to determine whether an asset 110 has been admitted to the virtual asset perimeter 130, and filters traffic to the asset 110, at least partially based on the contents of the perimeter assets database 202, according to one embodiment.

The perimeter assets database 202 includes characteristics, metadata, and identification for each of the assets 110 that are included in the virtual asset perimeter 130, according to one embodiment. The perimeter assets database 202 can be implemented as a table, a database, or other data structure. The perimeter assets database 202 includes information such as device IDs, IP addresses, MAC addresses, available resources, roles, offered services, and the like for one or more of the assets 110 that are included in the virtual asset perimeter 130, according to one embodiment. The virtual perimeter module 131 updates the perimeter assets database 202 when a new asset, e.g., asset 110H, is added to the virtual perimeter 130, or when an asset is removed from the virtual asset perimeter 130, according to one embodiment.

The services policy 203 includes rules and policies for providing services to the assets 110 that are internal and external to the virtual asset perimeter 130, according one embodiment. For example, if the asset 110B is a virtual asset that hosts a financial services application, the services policy 203 may include rules that permit the asset 110B to provide access to the financial services application to the assets 110 that are identified in the perimeter assets database 202, e.g., the assets 110 that are internal to the virtual asset perimeter 130, according to one embodiment. The services policy 203 may also include rules that prohibit the asset 110B from providing access to its financial services application to one or more of the assets 110 that are not identified in the perimeter assets database 202, e.g., the assets 110 that are external to the virtual asset perimeter 130, according to one embodiment. The services engine 204 executes the services policy 203 to enforce and apply the various rules defined within the services policy 203, according to one embodiment.

The user accounts database 205 includes information about the user accounts associated with the asset 110 onto which the virtual perimeter module 131 is installed, according to one embodiment. For example, the user accounts database 205 can include usernames, passwords, payment information, usage history, encryption algorithms, communication protocols, or similar information for each user account that receives services from, or that otherwise uses the resources of, an asset 110, according to one embodiment. Some of the user accounts may be linked to an asset 110 that uses poor security practices, e.g., unencrypted communications, and is outside of the virtual asset perimeter 130. Others of the user accounts may be linked to an asset 110 that applies stringent security practices. The virtual perimeter module 131 uses the characteristics of the user accounts and/or the characteristics of the service providers of the user accounts to determine a level of trust of each of the accounts. For example, if one account is associated with a social media service that reportedly installs malware on user computing systems, then that particular account will be assigned a low level of trust, according to one embodiment. In some embodiments, the user accounts of the user accounts database 205 are associated with links between an asset 110 and a user computing system. In other embodiments, the user accounts of the user accounts database 205 are associated with links between one asset 110 and another asset 110. In either case, the virtual perimeter module 131 can use the user accounts database 205 to assign levels of trust to user accounts to provide a secure computing environment, e.g., virtual network, for users to receive services with the user accounts. In one embodiment, if the user accounts database 205 includes a relatively low level of trust assigned to a particular user account, the services engine 204 blocks use of the particular user account to maintain the security of the virtual asset perimeter 130.

In one embodiment, the virtual perimeter module 131 optionally includes the admissions policy 206, the expulsion policy 207, and the admissions engine 208 for use by the assets 110 that have the authorization and/or the privileges for admitting/removing other assets to/from the virtual asset perimeter 130, according to one embodiment. In one embodiment, use of the admissions policy 206, the expulsion policy 207, and the admissions engine 208 is authorized based at least partially on the roles 132 associated with the asset 110. For example, the use of the admissions policy 206, the expulsion policy 207, and the admissions engine 208 can be limited to the assets 110 that have architect privileges and security privileges.

The admissions policy 206 includes rules, e.g., admissibility rules, and policies that determine when an asset 110 is admissible to the virtual asset perimeter 130, according to one embodiment. The admissibility rules include, but are not limited to, thresholds or requirements for authentication algorithms, length of encryption keys, life of the asset, memory capacity, processor speeds, operating system versions, user accounts to which the asset provides services, types of services provided, database capacity, communications protocols, communications traffic, and evidence of exposure to potential security threats, according to various embodiments. For example, the admissions policy 206 can include a rule that communications traffic to/from a potential admittee be clean of digital signatures and/or patterns that are associated with known security threats or potential security threats. As another example, the admissions policy 206 can include a rule that the configuration information of the assets indicates that an operating system of the asset is a version that post-dates a particular date or year, e.g., 2010. As another example, the admissions policy 206 can include a rule that a potential admittee employ encrypted communications of at least 256-bit encryption.

According to various other embodiments, the admissions policy 206 includes rules for potential admittees that are at least partially based on the characteristics or configuration information of the asset. For example, if a potential admittee is a smart phone, the admissions policy 206 may employ looser standards than if the potential admittee is a server. The admissions policy 206 includes rules that enable the assets 110 to automatically determine whether or not a potential admittee, e.g., another asset 110, can be admitted to the virtual asset perimeter 130 without compromising the security of the virtual asset perimeter 130, according to one embodiment.

The expulsion policy 207 includes rules and policies that determine when an asset 110 is to be removed or expelled from the virtual asset perimeter 130, according to one embodiment. The expulsion policy 207 includes rules that maintain the security and protection of the assets 110 that are within the virtual asset perimeter 130. The expulsion policy 207 more specifically includes rules that identify assets 110 that have been compromised by potential security threats or that have failed to maintain standards or requirements for admission to the virtual asset perimeter 130, in one embodiment. For example, the expulsion policy 207 can include a rule that an asset 110 be removed from the virtual asset perimeter 130 if a security scan of the asset 110 identifies one or more Trojan programs, viruses, or other malicious software. As another example, the expulsion policy 207 can include a rule that an asset 110 be removed from the virtual asset perimeter 130 if the configuration information of the asset 110 indicates a failure to update the asset 110 to a particular version of an operating system, indicates a failure to install a particular security patch, or indicates a failure to otherwise comply with one or more predetermined security standards or operations. The expulsion policy 207 can also include rules for providing notification to the assets 110 that are going to be expelled from the virtual asset perimeter 130, to provide the assets 110 with an opportunity to remedy any deficiencies, according to one embodiment The admissions engine 208 executes the admissions policy 206 and the expulsion policy 207 to enforce and apply the various rules defined within the admissions policy 206 and the expulsion policy 207, according to one embodiment. The admissions engine 208 can be configured to install an instance of the virtual perimeter module 131 onto a new admittee to the virtual asset perimeter 130, in one embodiment. The admissions engine 208 can be configured to assign one or more roles 132 to the new admittee, at least partially based on the configuration information of the new admittee. For example, the admissions engine 208 may assign security privileges to a new admittee, e.g., asset 110H, if the asset is associated with a computer security provider and is configured to provide security services to virtual networks. The admissions engine 208 updates the perimeter assets database 202 to reflect the admission of new assets and to reflect the removal of previous assets from the virtual asset perimeter 130, according to one embodiment. The admissions engine 208 transmits updates to instances of the perimeter assets database 202 throughout the virtual asset perimeter 130, so that each of the assets 110 within the virtual asset perimeter 130 has an up-to-date list of the assets 110 that are authorized to share services and resources within the virtual asset perimeter 130, according to one embodiment.

In one embodiment, the virtual perimeter module 131 optionally includes the security threat engine 209 and the security threat database 210 for use by the assets 110 that have the authorization and/or the privileges for performing security operations within the virtual asset perimeter 130, according to one embodiment. In one embodiment, the security threat engine 209 and the security threat database 210 are installed or enabled in the assets 110 that have the roles 132 of architect or security. The security threat engine 209 identifies potential security threats within the virtual asset perimeter 130 based at least partially on the contents of the security threat database 210, according to one embodiment. The security threat engine 209 periodically or pseudo-randomly performs security scans of the assets 110 within the virtual asset perimeter 130, to ensure that potential security threats do not compromise the integrity of the virtual asset perimeter 130, in one embodiment. The security threat engine 209 is configured to update the security threat database 210 based on prior security attacks and/or based on information received from one or more computer security repositories/databases, according to one embodiment. Once the security threat engine 209 identifies a potential security threat within the virtual asset perimeter 130, the security threat engine 209 is configured to transmit a security patch or other remedial code to the affected asset 110, in one embodiment. In another embodiment, once the security threat engine 209 identifies a potential security threat within the virtual asset perimeter 130, the security threat engine 209 is configured to notify the admissions engine 208 of the security breach so that the admissions engine 208 can expel the affected asset 110 from the virtual asset perimeter.

The operation of the virtual perimeter module 131 is described herein in terms of various modules, engines, policies, and databases, in accordance with various embodiments. However, in other embodiments, the functionality of the modules, engines, policies, and databases described herein can be implemented in the virtual perimeter module 131 or into a virtual perimeter agent using other hierarchies, organizational models, and/or techniques.

Process

Figure 3:
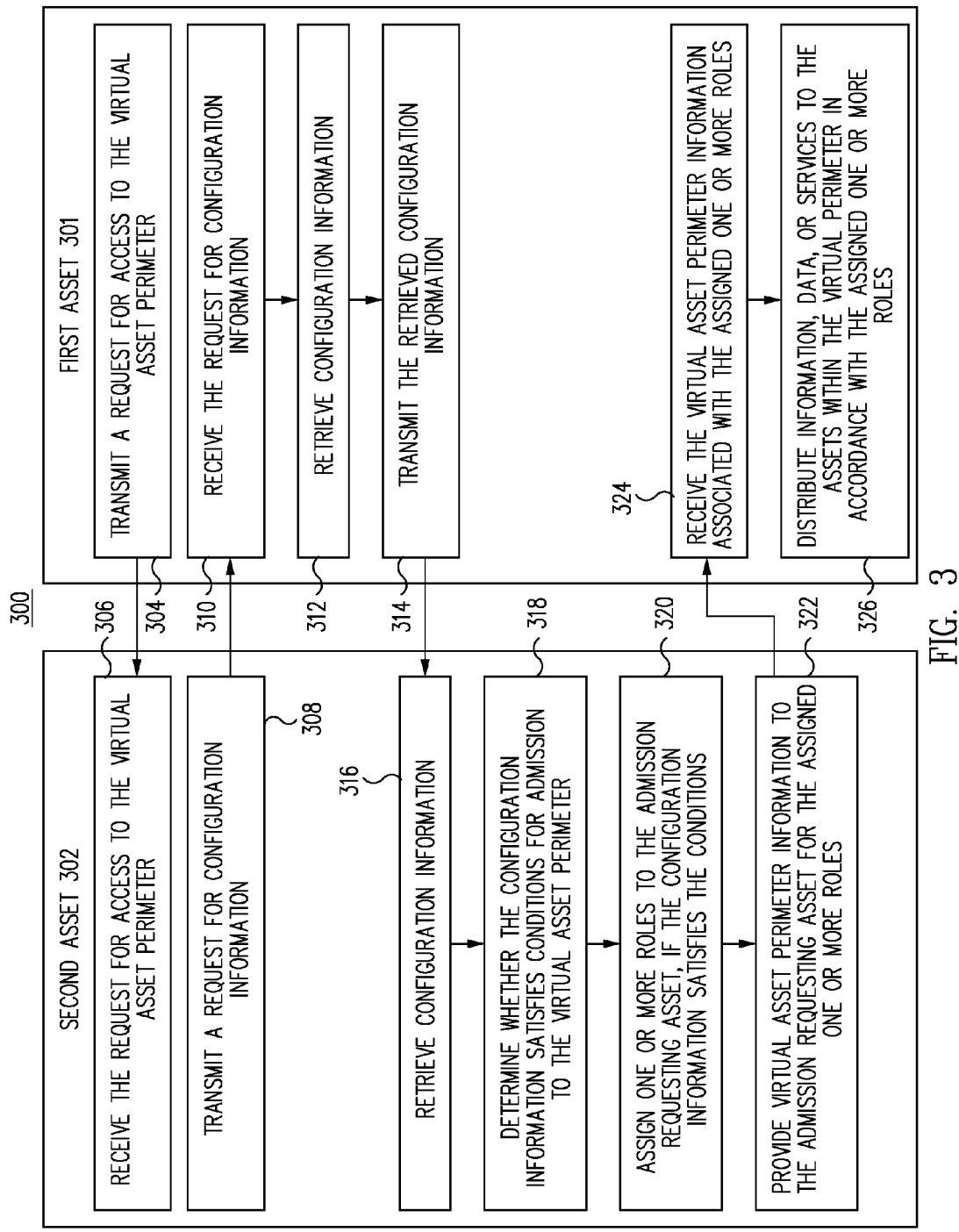
FIG. 3 is a flow diagram for admitting an asset to a virtual asset perimeter, in accordance with one embodiment.

FIG. 3 illustrates a functional flow diagram of a process 300 for adding a first asset 301 to a virtual asset perimeter with a second asset 302, according to one embodiment. The first asset 301 is one of the assets 110 that has not been admitted to the virtual asset perimeter 130 (shown in FIG. 1), and the second asset 302 is one of the assets 110 that has been admitted to the virtual asset perimeter 130, according to one embodiment.

At block 304, the first asset 301 transmits a request for access to the virtual asset perimeter, according to one embodiment.

At block 306, the second asset 302 receives the request for access to the virtual asset perimeter, according to one embodiment.

At block 308, the second asset 302 transmits a request for configuration information, according to one embodiment. The requested configuration information can include, but not be limited to, communication protocols, physical characteristics, operational characteristics, communication traffic history, or the like.

At block 310, the first asset 301 receives the request for configuration information, according to one embodiment.

At block 312, the first asset 301 retrieves configuration information, according to one embodiment.

At block 314, the first asset 301 transmits the retrieved configuration information to the second asset 302, according to one embodiment.

At block 316 the second asset 302 receives the retrieved configuration information from the first asset 301, according to one embodiment.

At block 318, the second asset 302 determines whether the configuration information satisfies conditions for admission to the virtual asset perimeter, according to one embodiment.

At block 320 the second asset 302 assigns one or more roles to the admission requesting asset, if the configuration information satisfies the conditions, according to one embodiment.

At block 322, the second asset 302 provides virtual asset perimeter information to the admission requesting asset for the assigned one or more roles, according to one embodiment. The virtual asset perimeter information can include a virtual perimeter module to enable the admission requesting asset to interact with one or more other assets that have been admitted to the virtual asset perimeter, according to one embodiment.

At block 324, the first asset 301 receives the virtual asset perimeter information associated with the one or more roles, according to one embodiment.

At block 326, the first asset 301 distributes information, data, or services to the assets within the virtual asset perimeter, in accordance with the assigned one or more roles, according to one embodiment.

Figure 4:
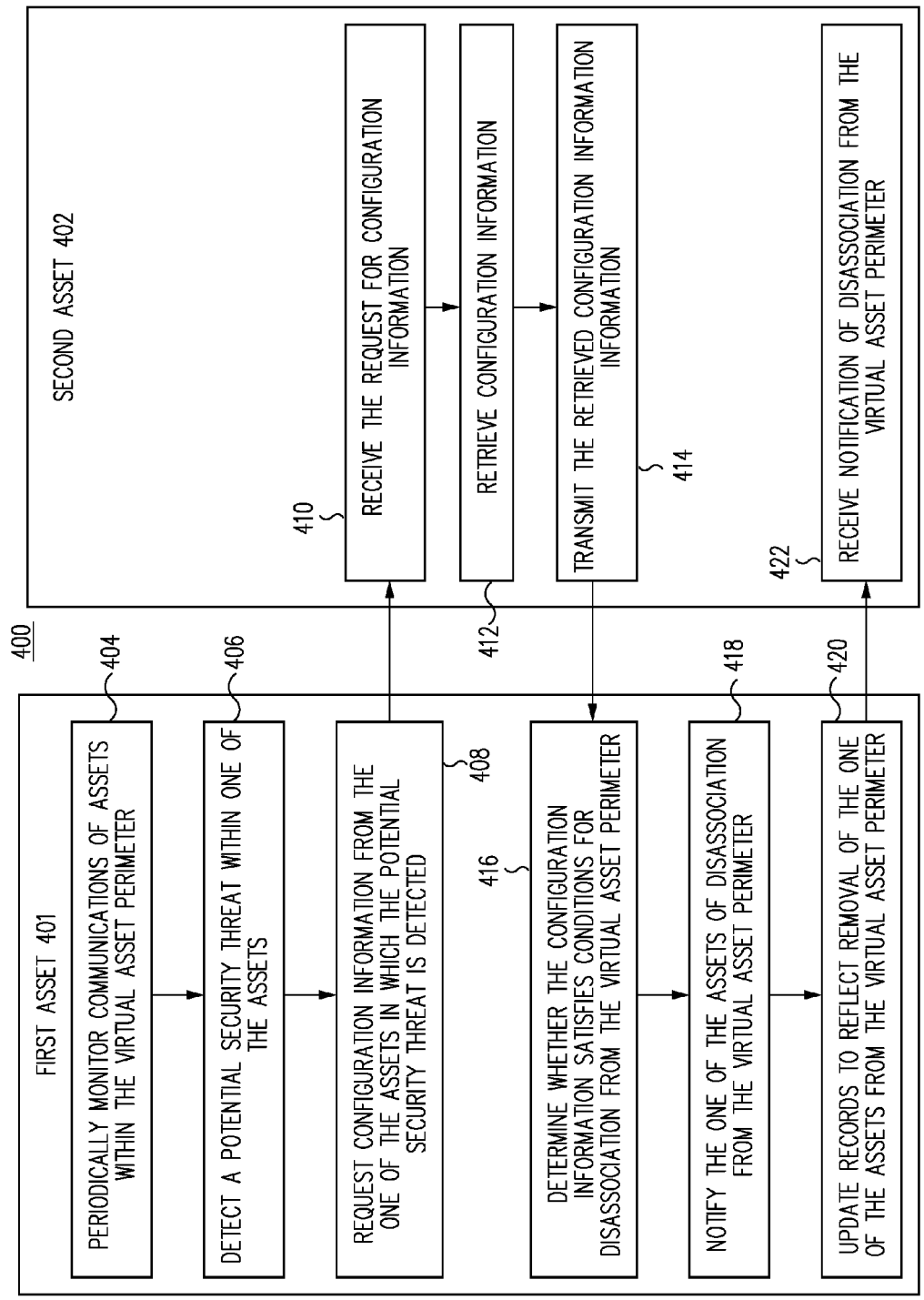
FIG. 4 is a flow diagram for removing an asset from a virtual asset perimeter, in accordance with one embodiment.

FIG. 4 illustrates a functional flow diagram of a process 400 for using a first asset 401 to remove or expel a second asset 402 from a virtual asset perimeter, according to one embodiment. The first asset 401 and the second asset 402 are assets 110 that have been admitted to the virtual asset perimeter 130 (shown in FIG. 1), according to one embodiment.

At block 404, the first asset 401 periodically monitors communications of assets within the virtual asset perimeter, according to one embodiment.

At block 406 the first asset 401 detects a potential security threat within one of the assets, according to one embodiment.

At block 408 the first asset 401 requests configuration information from the one of the assets in which the potential security threat is detected, according to one embodiment.

At block 410, the second asset 402 receives the request for configuration information, from the first asset 401, according to one embodiment.

At block 412, the second asset 402 retrieves configuration information, according to one embodiment.

At block 414, the second asset 402 transmits the retrieved configuration information, to the first asset 401, according to one embodiment.

At block 416, the first asset 401 determines whether the configuration information satisfies conditions for disassociation from the virtual asset perimeter, according to one embodiment.

At block 418, the first asset 401 notifies the one of the assets of disassociation from the virtual asset perimeter, according to one embodiment.

At block 420, the virtual asset 401 updates records to reflect removal of the one of the assets from the virtual asset perimeter, according to one embodiment. Updating the records can include updating one or more tables, data structures, and/or databases, according to one embodiment.

At block 422, the second asset 402 receives the notification of disassociation from the virtual asset perimeter, according to one embodiment.

Figure 5:
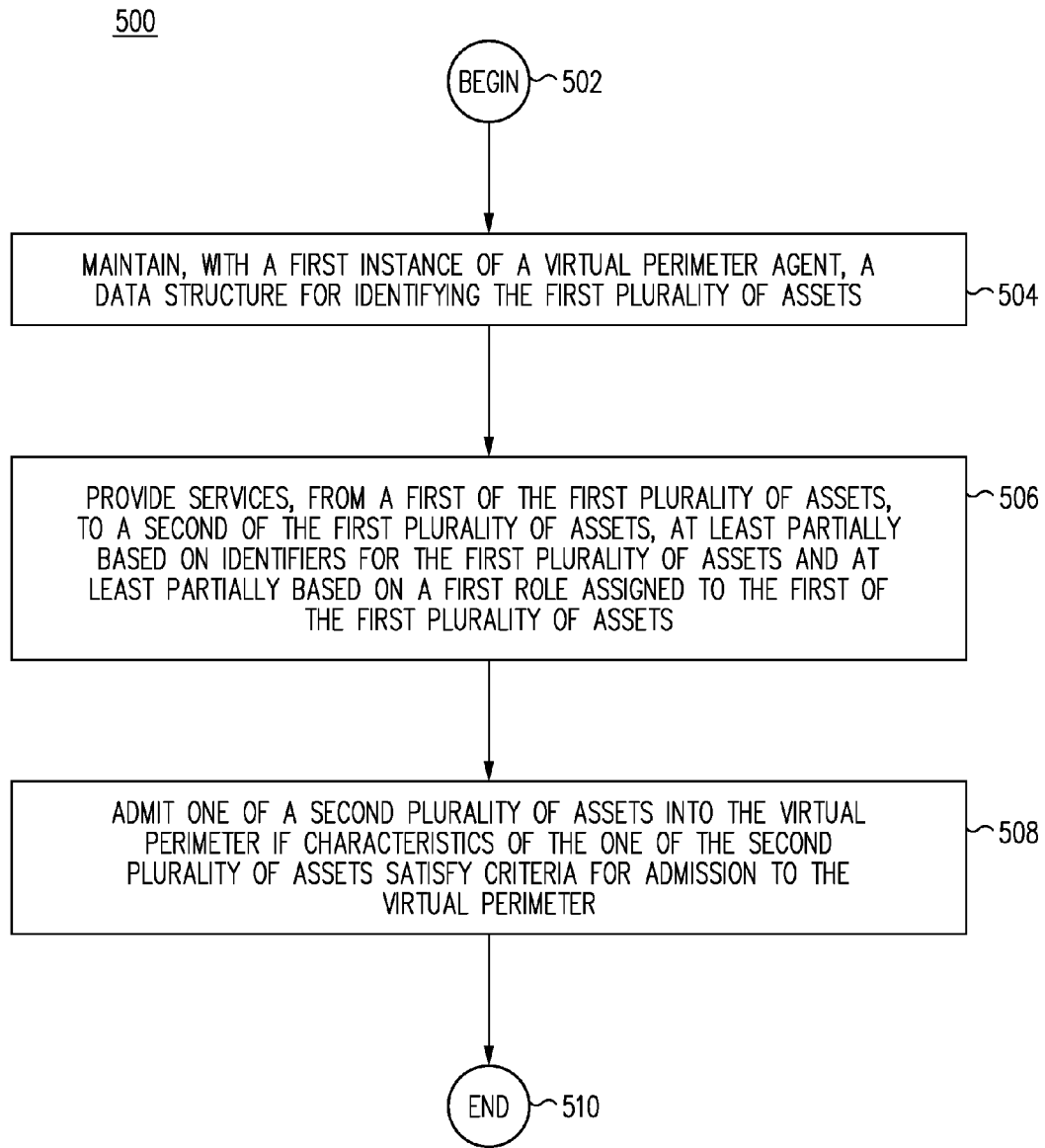
FIG. 5 is a flow diagram of a method for providing a virtual asset perimeter, in accordance with one embodiment.

FIG. 5 illustrates a process 500 for providing a virtual asset perimeter, according to one embodiment.

At block 502, the process begins.

At block 504, the process maintains, with a first instance of a virtual perimeter agent, a data structure for identifying the first plurality of assets, according to one embodiment. The first instance of the virtual perimeter agent resides on a first of the first plurality of assets, and the data structure includes identifiers for the first plurality of assets, according to one embodiment. The first plurality of assets include computing systems configured to communicate over one or more networks, and the first plurality of assets is included within the virtual perimeter and a second plurality of assets is excluded from the virtual perimeter, according to one embodiment.

At block 506, the process provides services, from a first of the first plurality of assets, to a second of the first plurality of assets, at least partially based on the identifiers for the first plurality of assets and at least partially based on a first role assigned to the first of the first plurality of assets, according to one embodiment. The first role is enforced on the first of the first plurality of assets by the first instance of the virtual perimeter agent, according to one embodiment.

At block 508, the process admits one of the second plurality of assets into the virtual perimeter if characteristics of the one of the second plurality of assets satisfy criteria for admission to the virtual perimeter, according to on embodiment. Admitting the one of the second plurality of assets can include installing a second instance of the virtual perimeter agent on the one of the second plurality of assets; adding an identifier of the one of the second plurality of assets to the data structure; and assigning a second role to the one of the second plurality of assets to determine second access privileges of the one of the second plurality of assets within the virtual perimeter, according to one embodiment.

At block 510, the process ends.

As noted above, the specific illustrative examples discussed above are but illustrative examples of implementations of embodiments of the method or process for providing a virtual asset perimeter. Those of skill in the art will readily recognize that other implementations and embodiments are possible. Therefore the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing a virtual perimeter for assets, comprising:
   maintaining, by a first instance of a virtual perimeter agent installed on a first virtual asset of a first plurality of assets, a data structure for identifying a first plurality of assets, wherein separate instances of the virtual perimeter agent reside on each virtual asset of the first plurality of assets, wherein the data structure includes identifiers for each asset of the first plurality of assets, wherein the first plurality of assets include virtual assets and computing systems configured to communicate over one or more networks, wherein the first plurality of assets is within a first virtual perimeter and a second plurality of assets is outside the first virtual perimeter but is inside a second virtual perimeter, at least one virtual asset of the second plurality of assets being assigned a first set of roles associated with the second virtual perimeter, wherein a given asset being assigned a role with respect to a given virtual perimeter enables the given asset to perform one or more virtual asset operations within the given virtual perimeter and restricts the given asset from performing other virtual asset operations within the given virtual perimeter;
   providing services, by the first virtual asset to a second virtual asset of the first plurality of assets, at least partially based on the identifiers for the first plurality of assets and based on a first role assigned to the first virtual asset, wherein the first role is enforced on the first of the first plurality of assets by the first instance of the virtual perimeter agent;
   qualifying, by the virtual perimeter agent of the first virtual asset by virtue of the first virtual asset being assigned a first virtual perimeter role enabling admissions operations, a third virtual asset of the second plurality of assets for admission into the first virtual perimeter by determining whether the third virtual asset satisfies criteria for admission into the first virtual perimeter, the qualification of the third virtual asset including:
      requesting, by the virtual perimeter agent of the first virtual asset of the third virtual asset, communications history of the third virtual asset;
      receiving, responsive to the request and from the third virtual asset at the first virtual asset, communications history data of the third virtual asset; and
      analyzing, by the virtual perimeter agent of the first virtual asset, the communications history data and comparing the communications history data against admissions and exclusionary criteria to determine whether to qualify the third virtual asset;
   admitting, by the virtual perimeter agent of the first virtual asset, the qualified third virtual asset into the first virtual perimeter by:
      installing, by the virtual perimeter agent of the first virtual asset, an instance of the virtual perimeter agent on the admitted qualified third virtual asset;
      adding, by the virtual perimeter agent of the first virtual asset, an identifier of the one of the second plurality of assets to the data structure; and assigning, by the virtual perimeter agent of the first virtual asset, a second role to the one of the second plurality of assets to determine second access privileges of the one of the second plurality of assets within the virtual perimeter.

2. The method of claim 1, further comprising:
selectively denying requests for the services, if the requests for the services are received from a computing system that is excluded from the data structure.

3. The method of claim 1, further comprising:
expelling, by the virtual perimeter agent of the first virtual asset, a suspicious asset of the first plurality of assets from the first virtual perimeter if one or more characteristics of the suspicious asset fails to satisfy the criteria for admission to the first virtual perimeter.

4. The method of claim 3, wherein the characteristics of the suspicious asset include one or more of an IP address, an availability of computing security software, exposure to a potential security threat, and types of users to which services are provided.

5. The method of claim 1, wherein an instance of the data structure is included in a plurality of instances of the virtual perimeter agent.

6. The method of claim 1, wherein the first plurality of assets includes one or more mobile devices, servers, and virtual machines.

7. The method of claim 1, wherein the services include one or more database hosting services, information management services, and application hosting services.

8. The method of claim 1, wherein the identifiers for the first plurality of assets include at least one of an IP address, a device ID, and an asset type descriptor for each of the first plurality of assets.

9. The method of claim 1, wherein each of the first plurality of assets is associated with at least one of a plurality of roles that defines at least one of a plurality of access privileges within the virtual perimeter.

10. The method of claim 9, wherein the plurality of roles include at least one of architect privileges, security privileges, developer privileges, user privileges, content generator privileges, editor privileges, and operator privileges.

11. The method of claim 10, wherein operations associated with admitting any of the second plurality of assets to the virtual perimeter are enabled only for ones of the first plurality of assets having architect privileges or security privileges.

12. The method of claim 10, wherein ones of the first plurality of assets having security privileges selectively scan the first plurality of assets for potential security threats.

13. The method of claim 12, wherein selectively scanning the first plurality of assets for the potential security threats includes:
monitoring communications traffic for digital signatures associated with the potential security threats; and
searching memory for the digital signatures associated with the potential security threats.

14. A computing system implemented method for maintaining a virtual perimeter of communicatively coupled assets, comprising:
receiving, at a virtual perimeter agent of a first virtual asset from a second virtual asset, a request for access to a first virtual perimeter, wherein the first asset is one of a first plurality of assets and the second asset is one of a second plurality of assets different from the first plurality of assets, wherein the first plurality of assets are included within the first virtual perimeter and the second plurality of assets are outside the virtual perimeter, wherein each of the first plurality of assets and each of the second plurality of assets include one or more of a server, a computing system, a virtual machine, and a mobile device, at least one virtual asset of the second plurality of assets being granted a first set of roles associated with a second virtual perimeter, wherein a given asset being assigned a role with respect to a given virtual perimeter enables the given asset to perform one or more virtual asset operations within the given virtual perimeter and restricts the given asset from performing other virtual asset operations within the given virtual perimeter;
transmitting, by the virtual perimeter agent of the first virtual asset to the second virtual asset, a request for communications history data of the second virtual asset;
receiving, from the second virtual asset by the first virtual asset, communications history data of the second asset;
analyzing, by the virtual perimeter agent of the first virtual asset, the communications history data and comparing the communications history data against admissions and exclusionary criteria to determine whether to qualify the second virtual asset for access to the first virtual perimeter;
qualifying, responsive to completing the analysis by the first virtual asset, by virtue of the first virtual asset being assigned a first virtual perimeter role enabling admissions operations, the second virtual asset;
admitting, by the virtual perimeter agent of the first virtual asset, the second virtual asset-into the first virtual perimeter by installing, by the virtual perimeter agent of the first virtual asset, an instance of the virtual perimeter agent on the qualified second virtual asset;
assigning, by the virtual perimeter agent of the first virtual asset, a role to the second virtual asset and determining second access privileges of the one of the second plurality of assets within the virtual perimeter based on the assigned role;
and
providing virtual perimeter admission information to the second asset to enable the second asset to share services and resources with the first plurality of assets within the first virtual perimeter.

15. The method of claim 14, wherein the installed virtual perimeter agent enables the second asset to perform secure communications within the virtual perimeter by identifying the first plurality of assets.

16. A system for providing a virtual perimeter, the system comprising:
at least one processor; and
at least one memory coupled to the at least one processor, the at least one memory having stored therein instructions which, when executed by any set of the at least one processors, perform a process for providing the virtual perimeter for assets, the process including:
maintaining, by a first instance of a virtual perimeter agent installed on a first virtual asset of a first plurality of assets, a data structure for identifying a first plurality of assets, wherein separate instances of the virtual perimeter agent reside on each virtual asset of the first plurality of assets, wherein the data structure includes identifiers for each asset of the first plurality of assets, wherein the first plurality of assets include virtual assets and computing systems configured to communicate over one or more networks, wherein the first plurality of assets is within a first virtual perimeter and a second plurality of assets is outside the first virtual perimeter but is inside a second virtual perimeter, at least one virtual asset of the second plurality of assets being assigned a first set of roles associated with the second virtual perimeter, wherein a given asset being assigned a role with respect to a given virtual perimeter enables the given asset to perform one or more virtual asset operations within the given virtual perimeter and restricts the given asset from performing other virtual asset operations within the given virtual perimeter;

providing services, by the first virtual asset to a second virtual asset of the first plurality of assets, at least partially based on the identifiers for the first plurality of assets and based on a first role assigned to the first virtual asset, wherein the first role is enforced on the first of the first plurality of assets by the first instance of the virtual perimeter agent;

qualifying, by the first virtual asset by virtue of the first virtual asset being assigned a first virtual perimeter role enabling admissions operations, a third virtual asset of the second plurality of assets for admission into the first virtual perimeter by determining whether the third virtual asset satisfies criteria for admission into the first virtual perimeter, the qualification of the third virtual asset including:

requesting, by the first virtual asset of the third virtual asset, communications history of the third virtual asset;

receiving, responsive to the request and from the third virtual asset at the first virtual asset, communications history data of the third virtual asset; and analyzing, by the first virtual asset, the communications history data and comparing the communications history data against admissions and exclusionary criteria to determine whether to qualify the third virtual asset;

admitting, by the first virtual asset, the qualified third virtual asset into the first virtual perimeter by:

installing, by the virtual perimeter agent of the first virtual asset, an instance of the virtual perimeter agent on the admitted qualified third virtual asset;

adding, by the virtual perimeter agent of the first virtual asset, an identifier of the one of the second plurality of assets to the data structure; and assigning, by the virtual perimeter agent of the first virtual asset, a second role to the one of the second plurality of assets to determine second access privileges of the one of the second plurality of assets within the virtual perimeter.

17. The system of claim 16, wherein the process further comprises:
selectively denying requests for the services, if the requests for the services are received from a computing system that is excluded from the data structure.

18. The system of claim 16, wherein the process further comprises:
expelling a suspicious asset of the first plurality of assets from the first virtual perimeter if characteristics of the suspicious asset fail to satisfy the criteria for admission to the first virtual perimeter.

19. The system of claim 18, wherein the characteristics of the suspicious asset include one or more of an IP address, an availability of computing security software, exposure to a potential security threat, and types of users to which services are provided.

20. The system of claim 16, wherein an instance of the data structure is included in instances of the virtual perimeter agent.

21. The system of claim 16, wherein the first plurality of assets includes one or more mobile devices, servers, and virtual machines.

22. The system of claim 16, wherein the services include one or more database hosting services, information management services, and application hosting services.

23. The system of claim 16, wherein the identifiers for the first plurality of assets include at least one of an IP address, a device ID, and an asset type descriptor for each of the first plurality of assets.

24. The system of claim 16, wherein each of the first plurality of assets is associated with at least one of a plurality of roles that defines at least one of a plurality of access privileges within the first virtual perimeter.

25. The system of claim 24, wherein the plurality of roles include at least one of architect privileges, security privileges, developer privileges, user privileges, content generator privileges, editor privileges, and operator privileges.

26. The system of claim 25, wherein admitting any of the second plurality of assets to the first virtual perimeter is limited to ones of the first plurality of assets having architect privileges or security privileges.

27. The system of claim 25, wherein ones of the first plurality of assets having security privileges selectively scan the first plurality of assets for potential security threats.

28. The system of claim 27, wherein selectively scanning the first plurality of assets for the potential security threats includes:
monitoring communications traffic for digital signatures associated with the potential security threats; and
searching memory for the digital signatures associated with the potential security threats.

29. A system for maintaining a virtual perimeter of communicatively coupled assets, comprising:
at least one processor; and
at least one memory coupled to the at least one processor, the at least one memory having stored therein instructions which when executed by any set of the at least one processors, perform a process for maintaining the virtual perimeter of the communicatively coupled assets, the process including:
receiving, at a virtual perimeter agent of a first virtual asset from a second virtual asset, a request for access to a first virtual perimeter, wherein the first asset is one of a first plurality of assets and the second asset is one of a second plurality of assets different from the first plurality of assets, wherein the first plurality of assets are included within the first virtual perimeter and the second plurality of assets are outside the virtual perimeter, wherein each of the first plurality of assets and each of the second plurality of assets include one or more of a server, a computing system, a virtual machine, and a mobile device, at least one virtual asset of the second plurality of assets being granted a first set of roles associated with a second virtual perimeter, wherein a given asset being assigned a role with respect to a given virtual perimeter enables the given asset to perform one or more virtual asset operations within the given virtual perimeter and restricts the given asset from performing other virtual asset operations within the given virtual perimeter;

transmitting, by the virtual perimeter agent of the first virtual asset to the second virtual asset, a request for communications history data of the second virtual asset;

receiving, from the second virtual asset by the first virtual asset, communications history data of the second asset;

analyzing, by the first virtual asset, the communications history data and comparing the communications history data against admissions and exclusionary criteria to determine whether to qualify the second virtual asset for access to the first virtual perimeter;

qualifying, responsive to completing the analysis by the first virtual asset, by virtue of the first virtual asset being assigned a first virtual perimeter role enabling admissions operations, the second virtual asset;

admitting, by the first virtual asset, the second virtual asset-into the first virtual perimeter by installing, by the virtual perimeter agent of the first virtual asset, an instance of the virtual perimeter agent on the qualified second virtual asset;

assigning, by the virtual perimeter agent of the first virtual asset, a role to the second virtual asset and determining second access privileges of the one of the second plurality of assets within the virtual perimeter based on the assigned role;

and providing virtual perimeter admission information to the second asset to enable the second asset to share services and resources with the first plurality of assets within the first virtual perimeter.

30. The system of claim 29, wherein the installed virtual perimeter agent enables the second asset to perform secure communications within the virtual perimeter by identifying the first plurality of assets.

* * * * *